United States Patent
Choi

(10) Patent No.: US 9,182,971 B2
(45) Date of Patent: Nov. 10, 2015

(54) DISTRIBUTED CONTROL METHOD AND APPARATUS USING URL

(75) Inventor: Hyok-sung Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 705 days.

(21) Appl. No.: 12/630,995

(22) Filed: Dec. 4, 2009

(65) Prior Publication Data

US 2010/0251350 A1  Sep. 30, 2010

(30) Foreign Application Priority Data

Mar. 27, 2009 (KR) .................. 10-2009-0026505

(51) Int. Cl.
*G06F 9/445* (2006.01)

(52) U.S. Cl.
CPC ........................... *G06F 8/65* (2013.01)

(58) Field of Classification Search
CPC ................. G06F 21/10; H04L 63/10
USPC .............. 726/7; 715/745; 713/2, 168, 185
See application file for complete search history.

(56) References Cited

U.S. PATENT DOCUMENTS

| | | | | |
|---|---|---|---|---|
| 5,333,266 | A * | 7/1994 | Boaz et al. ................ | 709/206 |
| 5,812,776 | A * | 9/1998 | Gifford ..................... | 709/217 |
| 6,249,817 | B1 | 6/2001 | Nakabayashi et al. | |
| 7,623,850 | B1 * | 11/2009 | Garg et al. ................ | 455/417 |
| 7,853,692 | B2 | 12/2010 | Kouda | |
| 8,706,833 | B1 * | 4/2014 | Bergant et al. ............ | 709/214 |
| 2002/0052798 | A1 | 5/2002 | Nishikado et al. | |
| 2002/0087559 | A1 * | 7/2002 | Pratt ........................ | 707/100 |
| 2002/0087643 | A1 * | 7/2002 | Parsons et al. ........... | 709/206 |
| 2003/0163740 | A1 * | 8/2003 | Thjai et al. .............. | 713/202 |
| 2004/0010562 | A1 | 1/2004 | Itonaga | |
| 2007/0208755 | A1 * | 9/2007 | Bhatkar et al. .......... | 707/10 |
| 2008/0137848 | A1 * | 6/2008 | Kocher et al. ............ | 380/201 |
| 2009/0077106 | A1 * | 3/2009 | Kawase et al. ........... | 707/100 |
| 2009/0150569 | A1 * | 6/2009 | Kumar et al. ............ | 709/248 |
| 2009/0276617 | A1 * | 11/2009 | Grell et al. .............. | 713/2 |
| 2009/0302997 | A1 * | 12/2009 | Bronstein ................ | 340/5.54 |
| 2009/0307490 | A1 * | 12/2009 | Dancer .................... | 713/168 |

(Continued)

FOREIGN PATENT DOCUMENTS

| | | | |
|---|---|---|---|
| JP | 2003-167810 A | 6/2003 | |
| JP | 2004-030309 A | 1/2004 | |

(Continued)

OTHER PUBLICATIONS

Sourlas, "Effective cache Management and Performance Limits in information-centric networks", 2013, IEEE, p. 955-960.*

(Continued)

*Primary Examiner* — Taghi Arani
*Assistant Examiner* — Gregory Lane
(74) *Attorney, Agent, or Firm* — Sughrue Mion, PLLC

(57) ABSTRACT

Provided is a distributed control method of data by a client connected to a first server and a network and a distributed control apparatus. The distributed control method includes: registering at least one piece of characteristic information of the client in the first server; generating a uniform resource locator (URL) address in a URL format based on the registered at least one piece of characteristic information; and acquiring data stored on the second server, wherein the acquired data is mirrored from data stored on the first server by using the generated URL address.

17 Claims, 9 Drawing Sheets

(56) References Cited

U.S. PATENT DOCUMENTS

2010/0205448 A1* 8/2010 Tarhan et al. ............. 713/185
2010/0235756 A1* 9/2010 Yoshihama ............. 715/745

FOREIGN PATENT DOCUMENTS

| JP | 2007-087426 A | 4/2007 |
| JP | 2007-213434 A | 8/2007 |
| JP | 2008-204480 A | 9/2008 |
| JP | 2008-310750 A | 12/2008 |

OTHER PUBLICATIONS

Communication dated Jan. 14, 2014, issued by the Japanese Patent Office in counterpart Japanese Application No. 2010-052930.
Communication issued on Nov. 25, 2014 by the Japanese Patent Office in related application No. 2010-052930.
Communication issued on Jan. 29, 2015 by the Korean Intellectual Property Office in related application No. 10-2009-0026505.

* cited by examiner

DISTRIBUTED CONTROL METHOD AND APPARATUS USING URL

CROSS-REFERENCE TO RELATED PATENT APPLICATION

This application claims priority from Korean Patent Application No. 10-2009-0026505, filed on Mar. 27, 2009, in the Korean Intellectual Property Office, the disclosure of which is incorporated herein in its entirety by reference.

BACKGROUND OF THE INVENTION

1. Field of the Invention

Methods and apparatuses consistent with the present invention relate to a distributed control method and an apparatus using a uniform resource locator (URL) in a distributed network environment.

2. Description of the Related Art

Recently, with the growth of Internet technologies, consumer electronic (CE) devices are merging with rapidly developing Internet technologies, and thus a server/client network is becoming a complex network of devices over time.

When the number of CE devices continuously increases, and thus there are a plurality of CE devices providing the same service, a load is concentrated in a centralized server managing the CE devices thereby increasing expenses for maintaining and managing the centralized server.

Moreover, in Internet-based CE devices, services corresponding to characteristics of each product, such as firmware upgrade or various application upgrades, are increasingly being used.

In a network environment including a centralized server and a plurality of clients, the centralized server manages all the clients, where each client transmits its own product characteristic information to the centralized server via a certain interface, and the centralized server returns control information according to each characteristic by logic-processing the product characteristic information. For example, when a device transmits an identifier (ID), a model name, firmware version information, and various tokens, which are product characteristic information, to the centralized server, the centralized server analyzes the product characteristic information, searches for control data applicable to the device in a database of the centralized server, and returns the control data to the device. The device is operated by downloading the control data from the centralized server, and changes its own status, such as upgrading a firmware version.

In other words, when the device periodically transmits a query to the centralized server, logic of the centralized server transmits a control command message to the device via version check, pre-scheduling, and policy control. Moreover, when the device transmits a message for requesting to download various contents from the centralized server, the centralized server transmits a binary image of data corresponding to the request via throttle control, wherein the data in the binary image is encoded.

SUMMARY OF THE INVENTION

The present invention provides a distributed control method and an apparatus using a uniform resource locator (URL) address in static data that may be shared by a plurality of clients.

According to an aspect of the present invention, there is provided a distributed control method of a client connected to a first server through a network, the distributed control method including: registering at least one piece of characteristic information of the client in the first server; generating a uniform resource locator (URL) address in a URL format based on the registered at least one piece of characteristic information; and acquiring data from at least one second server, wherein the acquired data is mirrored from data stored on the first server and is acquired by using the generated URL address.

The data stored in the at least one second server may be static data, and may be distributed and cached from the first server.

The registering may include: transmitting the at least one piece of characteristic information of the client to the first server; and receiving from the first server at least one piece of prompt information corresponding to the transmitted at least one piece of characteristic information, and the generating the URL address may include generating the URL address based on the received at least one piece of prompt information.

The at least one piece of characteristic information of the client may include at least one of a model number, a software (S/W) code, a device unique identifier (DUID), and an information provider (IP) address, and the at least one piece of prompt information may include at least one of a registration number, an area name, a grouping tag, a prompt base URL, and a prompt polling period.

The acquiring the data may include: listening to a notification message from the at least one second server; determining whether details about the client are included by interpreting the listened notification message; if the details are not included based on a result of the determination, performing a prompt scheduling operation for standing by for a following notification message; and if the details are included based on the result of the determination, performing a count scheduling operation for acquiring the data.

The performing the prompt scheduling operation may include: checking header information (e.g., entity tag (ETag)) indicating whether the notification message is changed; acquiring a body of the notification message if the checked header information is different from header information pre-stored in the client; and performing the count scheduling operation by interpreting the body of the notification message if the details are included.

The performing the count scheduling operation may further include acquiring a count value assigned to the client, from the first server, wherein the count value sequentially increases when a control request is received from the first server.

The acquiring the data may further include: receiving from the at least one second server adjust information mirrored in the at least one second server by synchronizing with information stored on the first server; and receiving the data by comparing the received adjust information with the count value assigned to the client.

The receiving the data may include receiving the data cached in the at least one second server by using the generated URL address, and may further include receiving a digital signature for the data from the at least one second server.

The distributed control method may further include: performing a validity verification by using the received digital signature; and if the validity verification is successful, upgrading software of the client by using the received data, if the validity verification succeeds.

According to another aspect of the present invention, there is provided a distributed control apparatus of a client connected to a first server through a network, the distributed control apparatus including: a characteristic information registering unit which registers at least one piece of characteristic information of the client in the first server; an address generating unit which generates a uniform resource locator (URL) address in a URL format, based on the registered at least one piece of characteristic information; and a data receiving unit which acquires data from at least one second server storing the data, wherein the acquired data is mirrored from data stored on the first sever by using the generated URL address.

The data stored in the at least one second server may be static data, and may be distributed and cached from the first server.

The characteristic information registering unit may transmit the at least one characteristic information of the client to the first server, and receive from the first server at least one piece of prompt information corresponding to the transmitted at least one characteristic information, and the address generating unit may generate the URL address based on the received at least one piece of prompt information.

The data receiving unit may include: a message listener which listens to a notification message from the at least one second server; a prompt scheduler which if details about the client are not included in the notification message, stands by for a following notification message by interpreting the listened notification message; and a count scheduler which if the details are included in the notification message, performs a count scheduling operation for acquiring the data.

The prompt scheduler may check header information (e.g., entity tag (ETag)) indicating whether the notification message is changed and if the checked header information is different from header information pre-stored in the client, acquire a body of the notification message, and if the details are included in the notification message, the count scheduler may perform the count scheduling operation.

The count scheduler may acquire from the first server a count value, which sequentially increases as a count value assigned to the client whenever a control request is received from the first server.

The data receiving unit may further include an adjust information receiver which receives from the at least one second server adjust information mirrored onto the at least one second server by synchronizing with the first server, and receives the data by comparing the received adjust information with the count value assigned to the client.

The data receiving unit may receive the data cached to the at least one second server by using the generated URL address, and may receive a digital signature for the data from the at least one second server.

The distributed control apparatus may further include: a validity verification unit which performs validity verification by using the received digital signature; and an upgrading unit which if the validity verification succeeds, upgrades software of the client by using the received data.

According to another aspect of the present invention, there is provided a distributed control system including: a first server which registers at least one piece of characteristic information of a client, and controls the client; at least one second server which stores static data that is distributed and cached from the first server; and the client which acquires the static data from the at least one second server by using a URL address in a URL format based on the at least one piece of characteristic information.

According to another aspect of the present invention, there is provided a computer readable recording medium having recorded thereon a program for executing the distributed control method described above.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Figure 1:
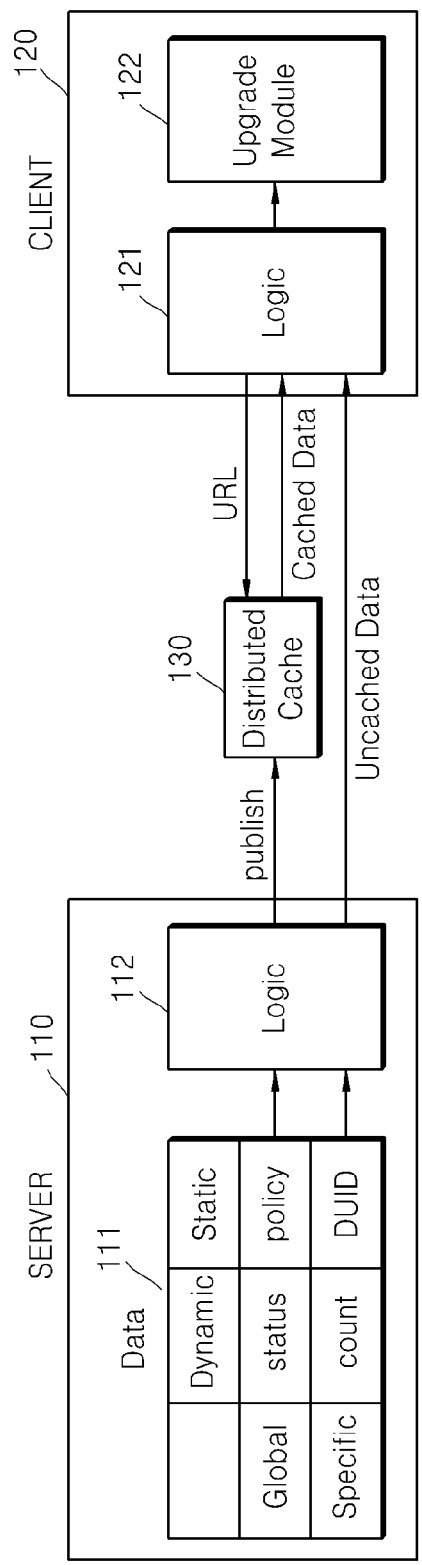
FIG. 1 is a block diagram for describing data in a global range, wherein the data is transferred between a server and a client by using a URL, according to an exemplary embodiment of the present invention.

Hereinafter, exemplary embodiments will be described in detail with reference to the attached drawings. In the drawings, like reference numerals denote like elements, and the sizes and thicknesses of layers and regions may be exaggerated for clarity.

FIG. 1 is a block diagram for describing data in a global range, wherein the data is transferred between a server 110 and a client 120 by using a URL, according to an exemplary embodiment of the present invention.

In a general control server/client method, a status of each client is managed via a logical operation 112 of the server. Accordingly, loads related to all control request messages are concentrated in a centralized server. Moreover, in designing a server, capacity is determined according to peak time requests. In addition, sharable information is difficult to use.

Referring to FIG. 1, data 111 provided by the server 110 is classified as dynamic data and static data, and also into data in a global range and in a specific range.

Here, the data in the global range such as status and policy information, i.e. data that can be shared since the data can be applied to groups, has a URL address, is published to a distributed cache 130, and is accessible by the client 120 by using the URL. Remaining data such as a count and a device unique identifier (DUID) may be transmitted from the server 110 to the client 120 without being cached.

Here, distributed-cached data may be provided to the client 120 by using content delivery networks (CDN) or a cache server. Accordingly, the client 120 generates a request URL using a logic operation 121 based on known characteristic data, and searches for data by using the request URL. An upgrade module 122 is also provided in the client 120 to apply the obtained data to update firmware in the client device.

Upgrading firmware may be divided into three operations. A first operation is pre-processing in which a device is registered, and a URL is generated based on characteristic information and the device is tagged. A second operation is a standby for a notification operation, where a firmware version is checked, and a notification message is acquired. Then, in a third operation, data is downloaded and firmware is upgraded while the transmission traffic is limited. Here, cached data may be used in the second operation, and if possible, the cached data may also be used in the third operation. As such, a server-client structure in which all pieces of information are shared can be designed.

Figure 2:
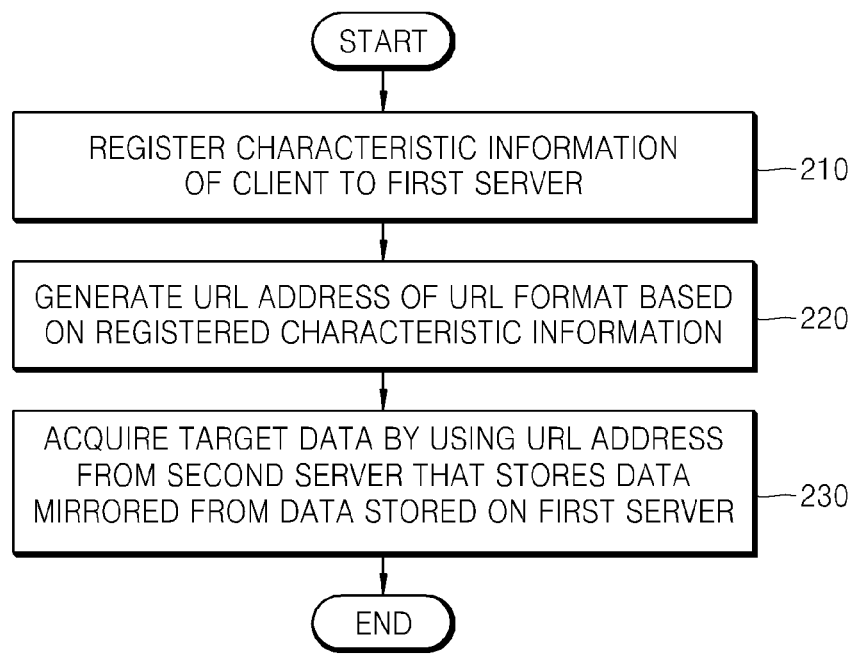
FIG. 2 is a flowchart illustrating a distributed control method of a client connected to a network, according to an exemplary embodiment of the present invention.

FIG. 2 is a flowchart illustrating a distributed control method of a client connected to a network, according to an exemplary embodiment of the present invention.

Referring to FIG. 2, the distributed control method of the client connected to a first server (centralized server) through the network includes registering at least one piece of characteristic information of the client in the first server (operation 210), generating a URL address of a URL format based on the registered characteristic information of the client (operation 220), and acquiring target data by using the URL address from at least one second server (cache server) that stores data mirrored from data stored on the first server (operation 230).

Here, the data stored in the second server is static data that can be shared by a plurality of devices, and is distributed and cached from the first server.

A URL structure for accessing the distributed and cached data may be combined by using characteristic information corresponding to each device, and may be compatible with a multi-CDN addressing. For example, when the latest firmware version of a certain model is to be determined, a URL combination is possible by "http://{area}.otn-m.sec.com/tv/{model name}/current/ver". Meanwhile, in order to listen to notification about a certain firmware version of a certain model, "http://{area}.otn-m.sec.com/tv/{model name}/{device F/W code}/notice" may be used, and in order to acquire a certain firmware image of a certain model, "http://{area}.otn-m.sec.com/tv/{model name}/{target F/W code}/image" may be used. Also, in order to acquire a digital signature for firmware of an image of a certain firmware version of a certain model, "http://{area}.otn-m.sec.com/tv/{model name}/{target F/W code}/ds/{device F/W code}" may be used.

Examples of {area}, {model name}, {target F/W code}, and {device F/W code} that may be changed according to each device include "http://ko.otn-s.sec.com/tv/LN46A750R1F/T-RBYAUSC1009.1/notice", which is notification information for digital TV (DTV) of a T-RBYAUSC1009.1 version of a LN46A750R1F model in a server in Korea. Also, "http://us.otn-s.sec.com/tv/LN46A750R1F/T-RBYAUS1012.1/ds/T-RBYAUSC1009.1" may be a digital signature of a T-RBYAUSC1012.1 version for DTV of a T-RBYAUSC1009.1 version of a LN46A750R1F model in a server in USA.

The distributed control method according to the current exemplary embodiment may be used to upgrade firmware or an application, and hereinafter, each operation of the distributed control method will be described in detail when firmware is upgraded.

Figure 3:
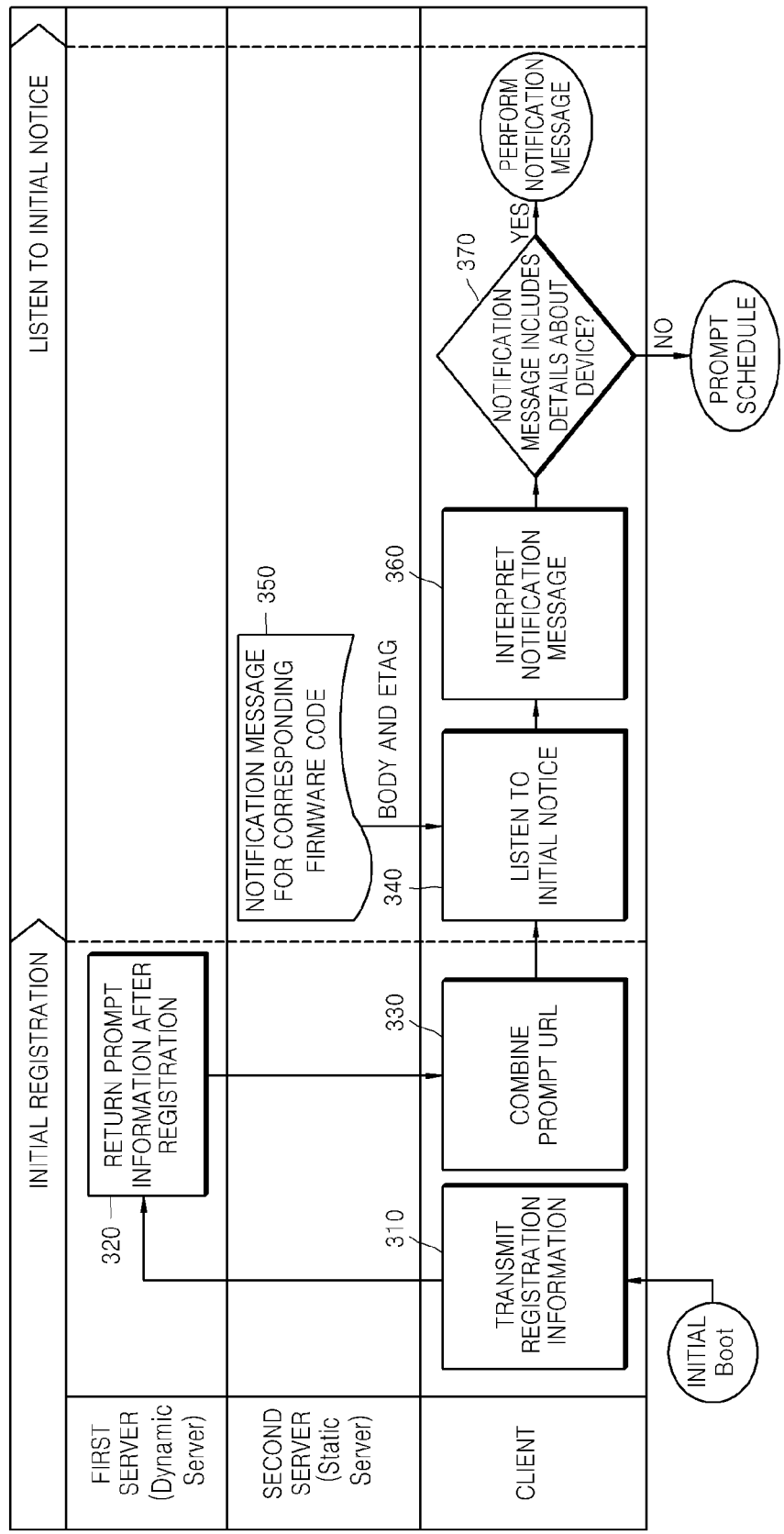
FIG. 3 is a flowchart illustrating an initial registration process and a process of listening to an initial notice during a firmware upgrading process, according to an exemplary embodiment of the present invention.

FIG. 3 is a flowchart illustrating an initial registration process and a process of listening to an initial notice during a firmware upgrading process, according to an exemplary embodiment of the present invention.

FIG. 3 illustrates three rows showing an operation order in a first server (dynamic server), which controls and monitors a client, a second server (static server), which may use CDN, and a device, which is the client.

First, the device transmits its own characteristic information to the first server as registration information, in operation 310. Here, the characteristic information may be a model number, a firmware code, a device unique ID (DUID), an IP address, or the like.

After the characteristic information is registered, the first server returns prompt information to the device, in operation 320. Here, the prompt information may be a registration number, an area name, a grouping tag, a prompt base URL, a prompt polling period, or the like.

In operation 330, the device generates combination of prompt URLs by using an area name, a tag, a model number, and a firmware code according to a prompt base URL format from the received prompt information. For example, the prompt URL may be "http://{area name}.otn-m.sec.com/tv/{model number}/{firmware code}/notice". Operations 310 through 330 are examples of operations in the initial registration process.

Then, regarding the process of listening to the initial notice 340, a notice for a corresponding firmware code is received from the second server that includes a body and an ETag, in operation 350, by using the prompt URL, and in operation 340, an entity tag (ETag) and a body of the notice is acquired and the ETag is stored. The ETag is a response header that is returned by a hypertext transfer protocol (HTTP) 1.1 compatible web server, and provides information required to check whether a resource is changed. The ETag is efficiently used in an application that has a cache function, such as a browser. For example, by comparing an ETag of a resource that is to be downloaded with an ETag of a resource that was previously received, overlapping resources are prevented from being unnecessarily downloaded. A value of an ETag may be generated based on a file size and a date of revising a file, or by using a checksum.

Then, in operation 360, details of a listened notification message is interpreted according to a predetermined interpreting method. In operation 370, it is determined whether the notification message includes details about the device. If it is determined that the notification message includes details about the device, the notification message is performed. If it is determined that the notification message does not include details about the device, a prompt scheduling operation is performed using the prompt polling period. Operations 340 through 370 are examples of operations in the process of listening to an initial notice.

For reference, an XML-based program design language (PDL) of the notification message is as follows.

```
<?xml version="1.0"?>
<edit name="prompt_period" mode="assign">
    <integer>86400</integer>
</edit>
<edit name="targetfirmcode" mode="assign">
    <string>T-RBYAWWC1012.1<string>
</edit>
<match pass_through="false">
  <test qual="any" name="region" compare="substr">
    <region>_Seoul</region>
    ...
```

```
</test>
<edit name="method" mode=assign">
  <method type="http_throttle"
  image_url="http://{otn_baseurl}/{targetfirmcode}/image"
  ... />
  <method ... />
</edit>
<seq>
    <method>http_throttle</method>
</seq>
</match>
```

Figure 4:
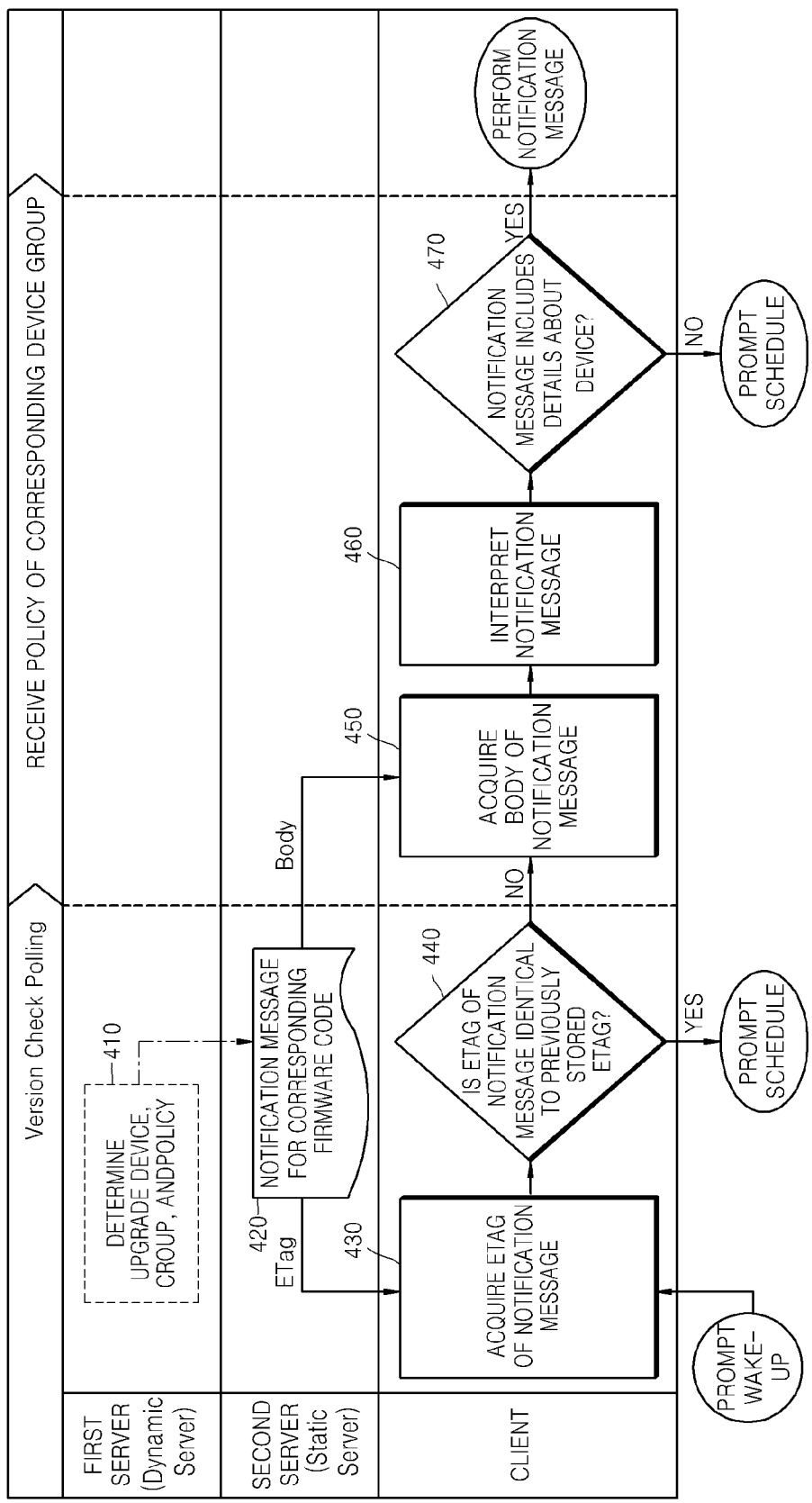
FIG. 4 is a flowchart illustrating a prompt scheduling process during a firmware upgrading process, according to an exemplary embodiment of the present invention.

FIG. 4 is a flowchart illustrating a prompt scheduling process during a firmware upgrading process, according to an exemplary embodiment of the present invention.

Referring to FIG. 4, a first server determines a device, group, and policy to be upgraded, and exports the determined device, group, and policy to a second server, in operation 410.

The second server stores a notification message for corresponding firmware code, in operation 420. A client acquires an ETag of the notification message by using a prompt URL, in operation 430, determines whether the ETag is identical to a previously stored Etag, in operation 440, and acquires a body of the notification message by using the prompt URL if the ETag is different from the previously stored Etag, in operation 450. Here, if a firmware version is not upgraded, operation 450 may not be performed. Operations 410 through 440 are a version check polling process.

Details of the listened notification message are interpreted according to a predetermined interpreting method, in operation 460, and it is determined whether the notification message includes details about a device (i.e. client), in operation 470. If it is determined that the notification message includes details about the device, the notification message is performed. If it is determined that the notification message does not include details about the device, a prompt scheduling operation is performed. Operations 450 through 470 are a process of receiving a policy of a device group.

Figure 5:
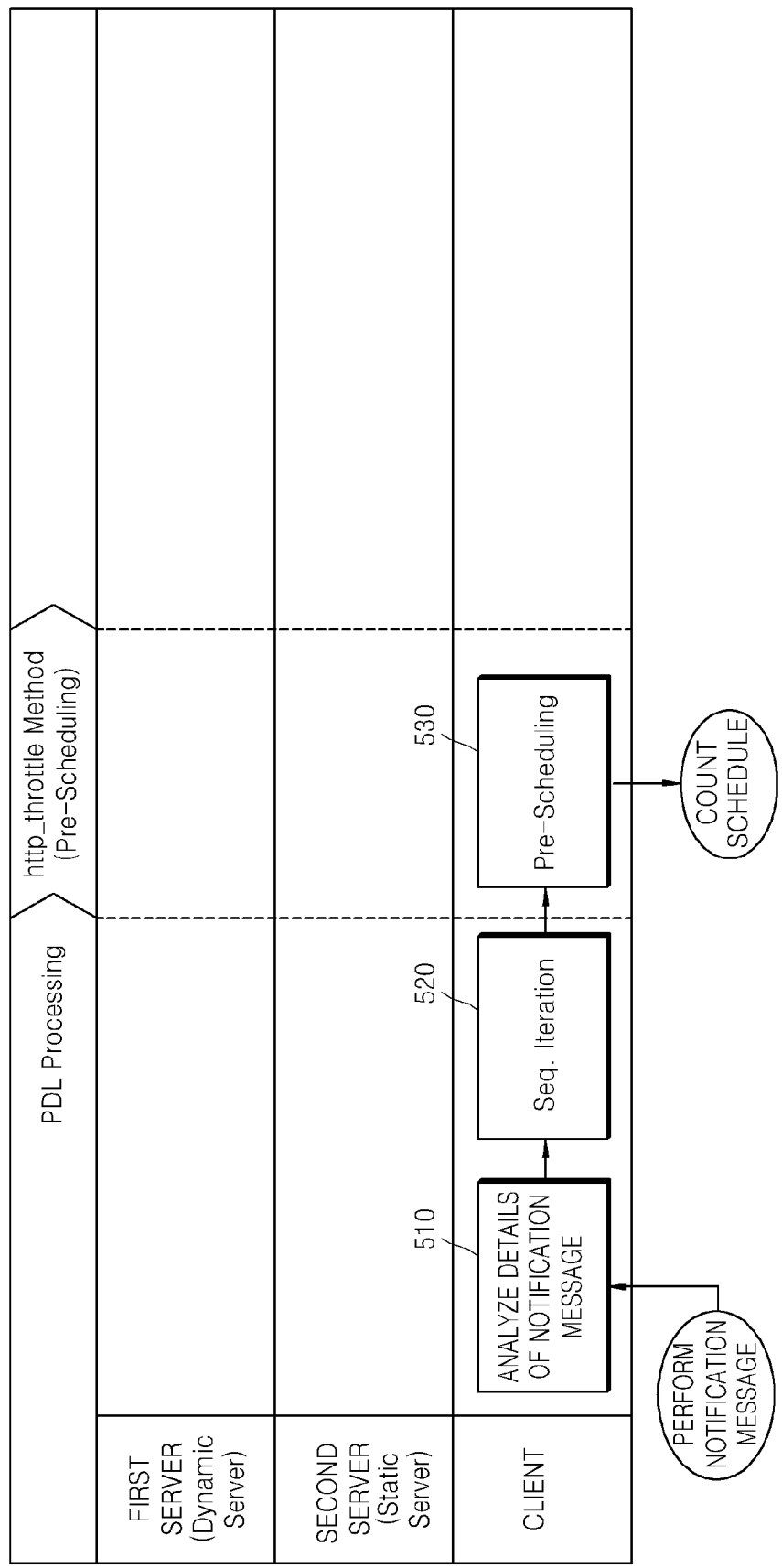
FIG. 5 is a flowchart illustrating a pre-scheduling process during a firmware upgrading process, according to an exemplary embodiment of the present invention.

FIG. 5 is a flowchart illustrating a pre-scheduling process during a firmware upgrading process, according to an exemplary embodiment of the present invention.

Referring to FIG. 5, when a notification message is performed, details of the notification message are first analyzed, in operation 510. Then, a method is performed in operation 520 according to a sequence (sequential operations) defined in the details of the notification message. Operations 510 and 520 are a processing operation of the XML-based PDL described above.

Then, in operation 530, a pre-scheduling is performed so as to download cached data. A count scheduling operation of a corresponding device is performed by using variables defined by a method in the details of the notification message.

Figure 6:
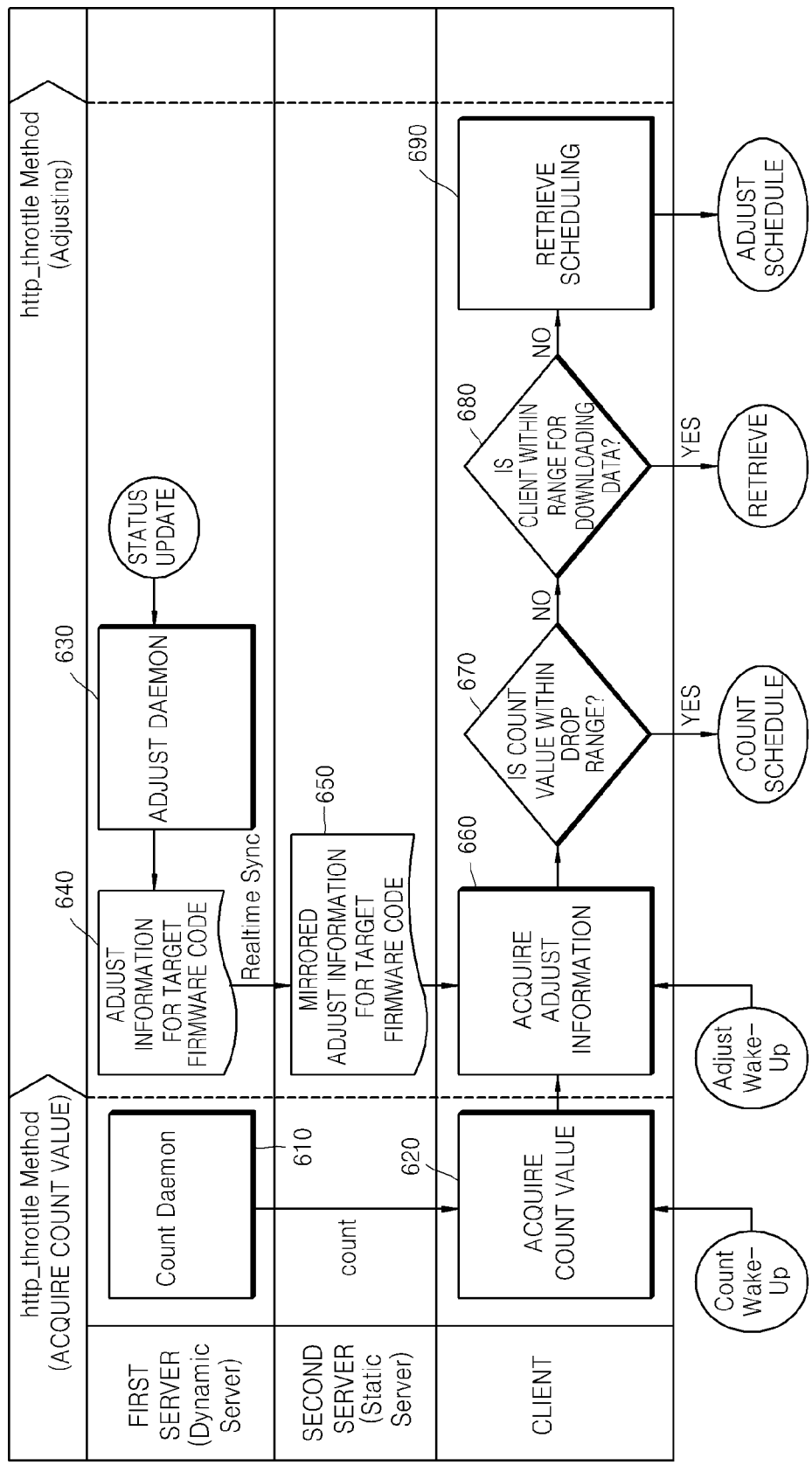
FIG. 6 is a flowchart illustrating a count scheduling and traffic adjusting process during a firmware upgrading process, according to an exemplary embodiment of the present invention.

FIG. 6 is a flowchart illustrating count scheduling and traffic adjusting processes during a firmware upgrading process, according to an exemplary embodiment of the present invention.

Referring to FIG. 6, a count daemon is first performed in a first server, in operation 610, and a count value is sequentially increased whenever a throttle control is requested and a client acquires the count value by accessing a count URL, in operation 620.

Meanwhile, the first server performs an adjust daemon, in operation 630, so as to export monitoring information and traffic expectation information according to each client based on a downloading status, and generates adjust information for a target firmware code, in operation 640. In addition, the same mirrored adjust information is simultaneously stored in a second server, in operation 650. The adjust information may include a service range, an average unit service period, and a reference timestamp.

The client acquires the adjust information by accessing an adjust URL, in operation 660. It is determined whether a count value is within a drop range, in operation 670. If it is determined that the count value is within the drop range, a count scheduling is performed.

Otherwise, if it is determined that the count value is not within the drop range, it is determined whether the client is within a range for downloading data, in operation 680, by referring to the adjust information. If it is determined that the client is within the range, a data retrieving operation is performed, If it is determined that the client is not within the range, retrieve scheduling is performed, in operation 690 and an adjust scheduling operation is performed.

Figure 7:
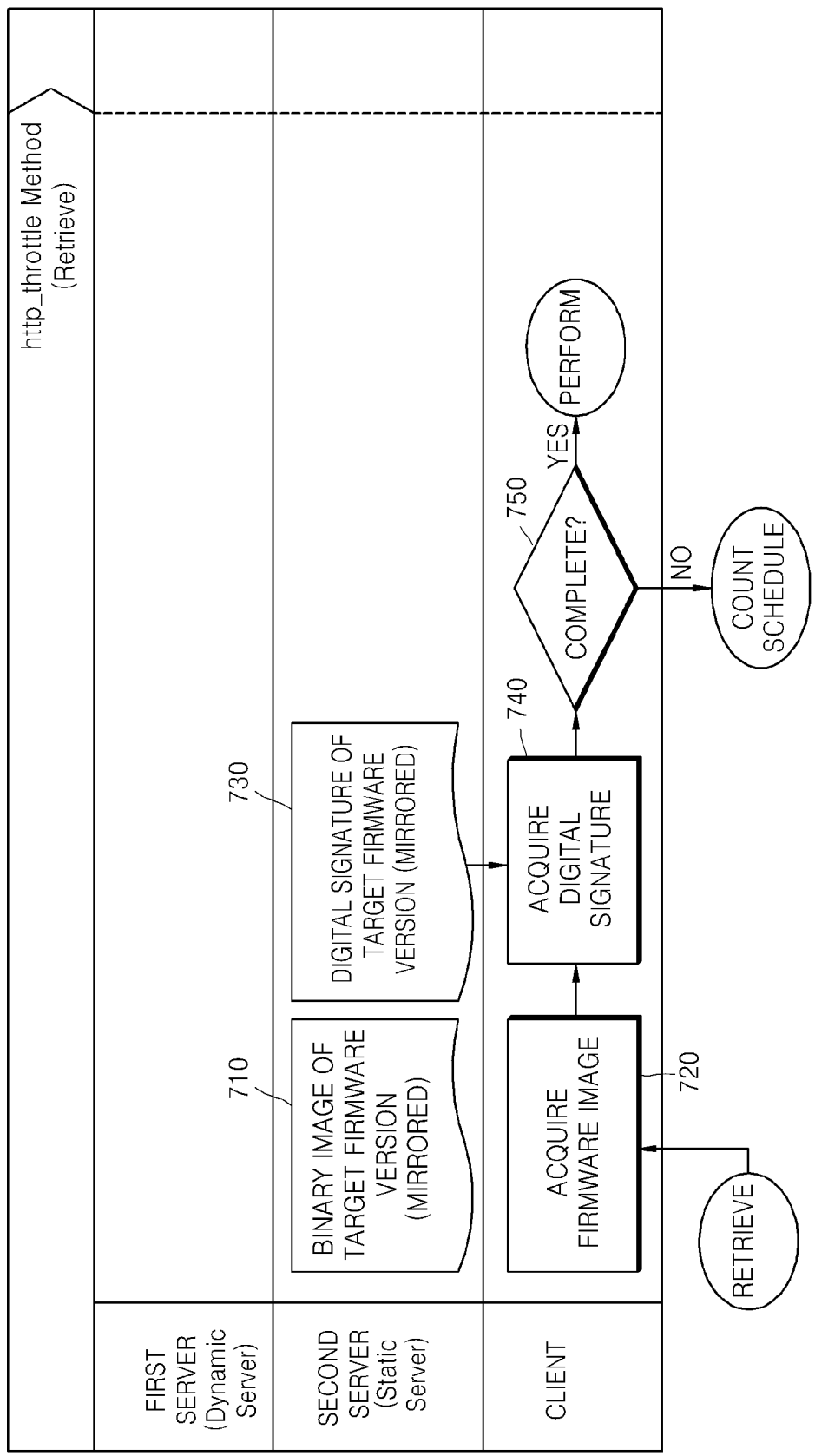
FIG. 7 is a flowchart illustrating a data retrieving process during a firmware upgrading process, according to an exemplary embodiment of the present invention.

FIG. 7 is a flowchart illustrating a data retrieving process during a firmware upgrading process, according to an exemplary embodiment of the present invention.

Referring to FIG. 7, a binary image of a target firmware version is mirrored to a second server, in operation 710, and a client acquires a firmware image, in operation 720. In addition, the client acquires a digital signature required to execute the firmware image from the second server, in operation 740. Here, a digital signature of the target firmware version is mirrored to the second server, in operation 730. If it is determined that the digital signature is successfully acquired, in operation 750, the binary image of the target firmware version may be performed. If it is determined that the digital signature is not successfully acquired, in operation 750, the count scheduling is performed.

Figure 8:
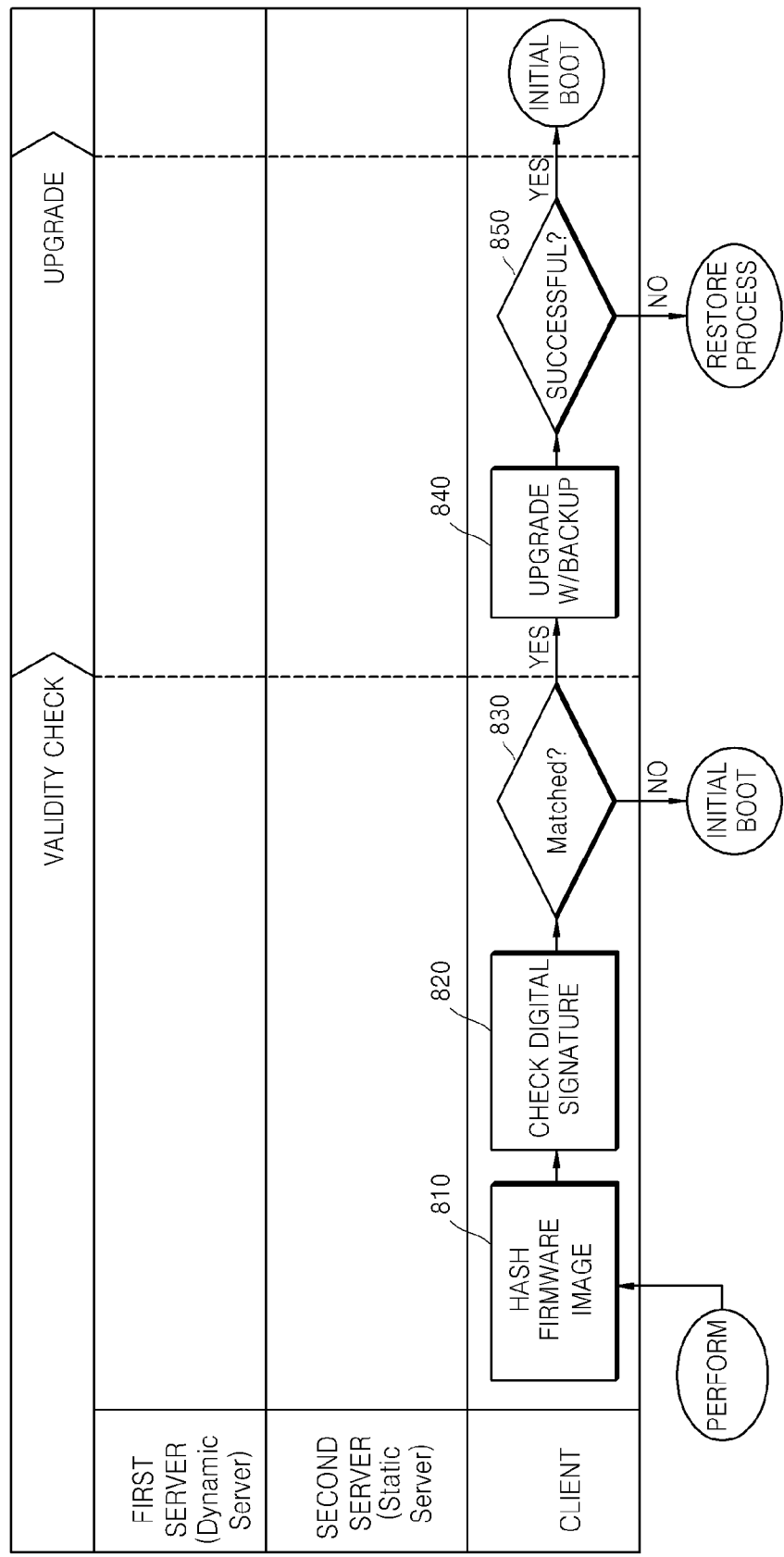
FIG. 8 is a flowchart illustrating a validity checking and upgrading process during a firmware upgrading process, according to an exemplary embodiment of the present invention.

FIG. 8 is a flowchart illustrating validity checking and upgrading processes during a firmware upgrading process, according to an exemplary embodiment of the present invention.

FIG. 8 illustrates the validity checking and upgrading processes so as to perform a binary image of a target firmware version. In operation 810, a firmware image is hashed so as to compare the hashed firmware image with a hash value of a digital signature, and in operation 820, the digital signature is checked by using a public key in a client. In operation 830, it is determined whether the hashed firmware image matches the hash value of the digital signature. If it is determined that the hashed firmware image matches the hash value of the digital signature, the firmware is upgraded in operation 840. If required, a back-up process may also be performed in operation 840. If it is determined that the hashed firmware image does not match the hash value of the digital signature, initial boot is performed.

It is determined whether the upgrading process is successful, in operation 850. If it is determined that the upgrading process fails, a restore process is performed. If it is determined that the upgrading process succeeds, the initial registration process for example such as the one depicted in FIG. 3 is performed.

Figure 9:
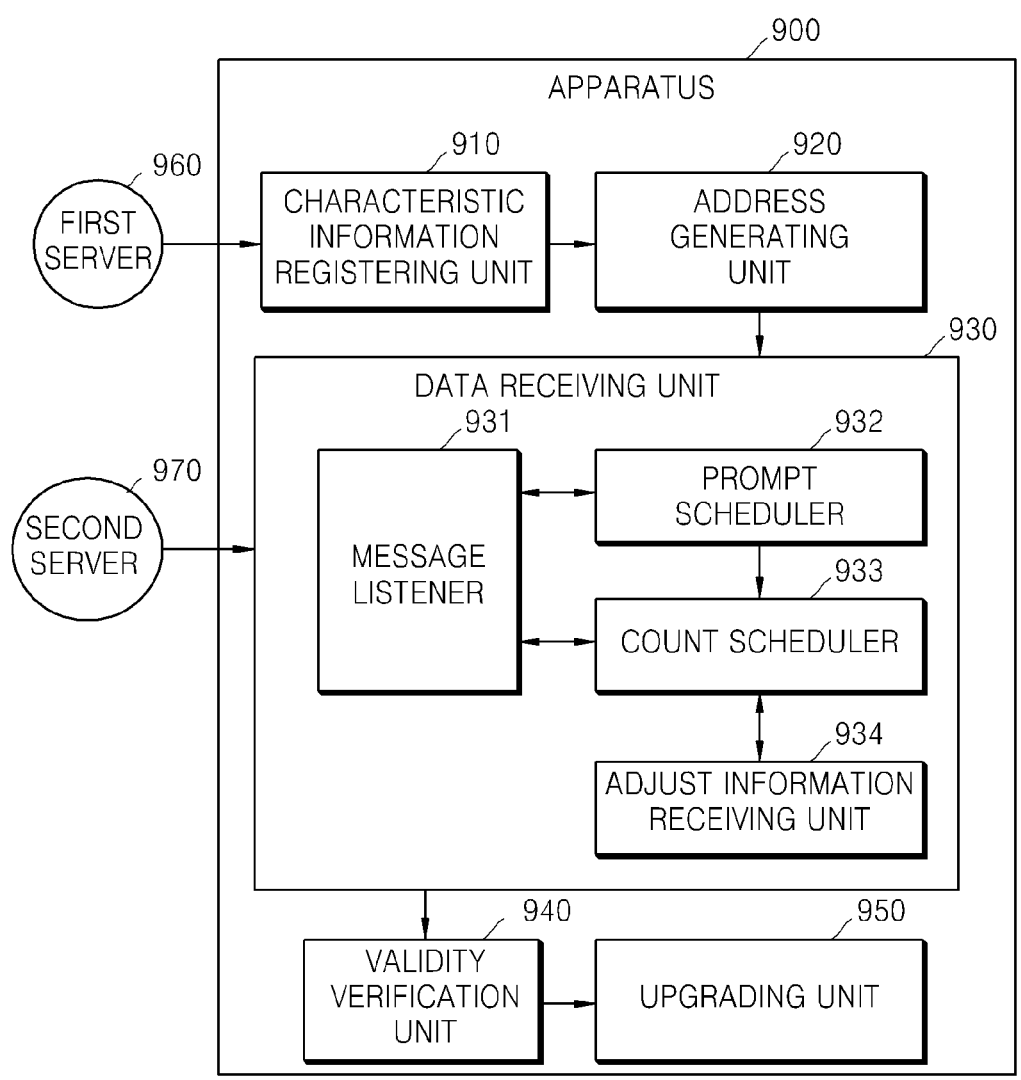
FIG. 9 is a block diagram of a distributed control apparatus of a client connected to a network, according to an exemplary embodiment of the present invention.

FIG. 9 is a block diagram of a distributed control apparatus 900 of a client connected to a network, according to an exemplary embodiment of the present invention.

Referring to FIG. 9, the distributed control apparatus 900 according to the current exemplary embodiment of the present invention includes a characteristic information registering unit 910 which registers at least one piece of characteristic information of a client in a first server 960, an address generating unit 920 which generates a URL address of a URL format based on the registered characteristic information, and a data receiving unit 930 which acquires data by using the URL address, from at least one second server 970 that stored mirrored data.

Meanwhile, the data receiving unit 930 includes a message listener 931 which listens to a notification message from the at least one second server 970, a prompt scheduler 932 which stands by for a following notification message when details corresponding to the client are not included in the notification message by interpreting the notification message, and a count scheduler 933 which performs count scheduling so as to obtain the data when the details corresponding to the client are included. In addition, the data receiving unit 930 may further include an adjust information receiving unit 934 which receives adjust information that is mirrored to the at least one second server 970 from the first server 960.

The distributed controlling apparatus 900 may further include a validity verification unit 940 which performs validity verification by using a digital signature, and an upgrading unit 950 which performs software upgrade by using received data when the validity verification succeeds.

According to a distributed control method, a load of a server controlling a group having a low request frequency may be removed, and the occurrence of a load concentrating in the server during a peak time may be decreased, and thus the expenses of maintaining the server may be decreased. Moreover, the distributed control method can be applied to a multi-CDN, and may be used in a web service linked DTV, a mobile phone, and other CE products.

The exemplary embodiments of the present invention can be written as computer programs and can be implemented in general-use digital computers that execute the programs using a computer readable recording medium.

Also, the structure of the data used in exemplary embodiment of the present invention may be recorded on a computer readable recording medium via various methods.

Examples of the computer readable recording medium include magnetic storage media (e.g., ROM, floppy disks, hard disks, etc.), optical recording media (e.g., CD-ROMs, or DVDs), and storage media.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A distributed control method controlling a client connected to a first server through a network, the distributed control method comprising: registering at least one piece of characteristic information of the client in the first server, wherein the registering comprises:
   transmitting at least one piece of characteristic information of the client to the first server; and
   receiving from the first server at least one piece of prompt information corresponding to the transmitted at least one piece of characteristic information;
   generating, by the client, a uniform resource locator (URL) address in a URL format based on the registered at least one piece of characteristic information, wherein the generating the URL address comprises generating the URL address based on the received at least one piece of prompt information;
   acquiring, by the client, data from at least one second server storing the data, wherein the acquired data is mirrored from data stored on the first server and is acquired by using the generated URL address wherein the client and the first server are distinct devices, and
   wherein the data stored in the at least one second server is static data, and is distributed and cached from the first server.

2. The distributed control method of claim 1, wherein the at least one piece of characteristic information of the client comprises at least one of a model number, a software code, a device unique identifier, and an information provider address, and the at least one piece of prompt information comprises at least one of a registration number, an area name, a grouping tag, a prompt base URL, and a prompt polling period.

3. The distributed control method of claim 1, wherein the acquiring the data comprises:
   receiving a notification message from the at least one second server;
   determining whether details about the client are included in the notification message by interpreting the listened notification message;
   if it is determined that the details are not included in the notification message, performing a prompt scheduling operation for standing by for a following notification message; and
   if it is determined that the details are included in the notification message, performing a count scheduling operation for acquiring the data.

4. The distributed control method of claim 3, wherein the performing the prompt scheduling operation comprises:
   checking header information indicating whether the notification message is changed;
   acquiring a body of the notification message if the checked header information is different from header information pre-stored in the client; and
   performing the count scheduling operation by interpreting the body of the notification message if the details are included in the notification message.

5. The distributed control method of claim 4, wherein the performing the count scheduling operation comprises acquiring a count value assigned to the client, from the first server, wherein the count value sequentially increases when a control request is received from the first server.

6. The distributed control method of claim 5, wherein the acquiring the data further comprises:
   receiving from the at least one second server adjust information mirrored in the at least one second server by synchronizing with information stored on the first server; and
   receiving the data by comparing the received adjust information with the count value assigned to the client.

7. The distributed control method of claim 6, wherein the receiving the data comprises: receiving the data cached in the at least one second server by using the generated URL address, and receiving a digital signature for the data from the at least one second server.

8. The distributed control method of claim 7, further comprising:
   performing a validity verification by using the received digital signature; and
   if the validity verification is successful, upgrading software of the client by using the received data.

9. A distributed control apparatus of a client connected to a first server through a network, the distributed control apparatus comprising:
- a characteristic information registering unit comprising circuitry which registers at least one piece of characteristic information of the client in the first server,
- wherein the characteristic information registering unit transmits the at least one characteristic information of the client to the first server, and receives from the first server at least one piece of prompt information corresponding to the transmitted at least one characteristic information;
- an address generating unit which generates a uniform resource locator (URL) address in a URL format, based on the registered at least one piece of characteristic information, wherein the address generating unit generates the URL address based on the received at least one piece of prompt information;
- a data receiving unit which acquires data from at least one second server storing the data, wherein the acquired data is mirrored from data stored on the first sever by using the generated URL address wherein the characteristic information registering unit, the address generating unit, and the data receiving unit are comprised in a single device that is distinct from the first server, and wherein the data stored in the at least one second server is static data, and is distributed and cached from the first server.

10. The distributed control apparatus of claim 9, wherein the data receiving unit comprises:
- a message listener which listens to a notification message from the at least one second server;
- a prompt scheduler which if details about the client are not included in the notification message, stands by for a following notification message by interpreting the listened notification message; and
- a count scheduler which, if the details are included in the notification message, performs a count scheduling operation for acquiring the data.

11. The distributed control apparatus of claim 9, wherein the prompt scheduler checks header information indicating whether the notification message is changed and if the checked header information is different from header information pre-stored in the client, acquires a body of the notification message, and if the details are included in the notification message, the count scheduler performs the count scheduling operation.

12. The distributed control apparatus of claim 11, wherein the count scheduler acquires from the first server a count value, which sequentially increases as a count value assigned to the client whenever a control request is received from the first server.

13. The distributed control apparatus of claim 12, wherein the data receiving unit further comprises an adjust information receiver which receives from the at least one second server adjust information mirrored onto the at least one second server by synchronizing with the first server, and receives the data by comparing the received adjust information with the count value assigned to the client.

14. The distributed controlling apparatus of claim 13, wherein the data receiving unit receives the data cached to the at least one second server by using the generated URL address, and receives a digital signature for the data from the at least one second server.

15. The distributed controlling apparatus of claim 14, further comprising:
- a validity verification unit which performs validity verification by using the received digital signature; and
- an upgrading unit which if the validity verification succeeds, upgrades software of the client by using the received data.

16. A distributed control system comprising:
- a first server which registers at least one piece of characteristic information of a client, and controls the client, wherein a characteristic information registering unit transmits the at least one characteristic information of the client to the first server, and receives from the first server at least one piece of prompt information corresponding to the transmitted at least one characteristic information;
- at least one second server which stores static data that is distributed and cached from the first server; and the client which acquires the static data from the at least one second server by generating and using a uniform resource locator (URL) address in a URL format based on the at least one piece of characteristic information, wherein the address generating unit generates the URL address based on the received at least one piece of prompt information, and wherein the client and the first server are distinct devices.

17. A non-transitory computer readable recording medium having recorded thereon instructions for executing a method of updating a device, the method comprising:
- registering a device with a server and generating, by the device, a URL address for the device based on characteristic information of the device, wherein a characteristic information registering unit transmits the at least one characteristic information of the device to a first server, and receives from the first server at least one piece of prompt information corresponding to the transmitted at least one characteristic information; acquiring data from a distributed cache using the generated URL address, wherein an address generating unit generates the URL address based on the received at least one piece of prompt information; and updating at least one of firmware and software in the device using the acquired data, wherein the data is static data and is published in the distributed cache from a server, wherein the device and the server are distinct devices.

* * * * *